US006490388B1

United States Patent
Manzur

(10) Patent No.: US 6,490,388 B1
(45) Date of Patent: Dec. 3, 2002

(54) SIDE-PUMPED FIBER LASER

(75) Inventor: Tariq Manzur, Lincoln, RI (US)

(73) Assignee: Optigain, Inc., Peace Dale, RI (US)

( * ) Notice: Subject to any disclaimer, the term of this patent is extended or adjusted under 35 U.S.C. 154(b) by 0 days.

(21) Appl. No.: 09/519,793

(22) Filed: Mar. 7, 2000

Related U.S. Application Data

(60) Provisional application No. 60/123,211, filed on Mar. 8, 1999, and provisional application No. 60/123,214, filed on Mar. 8, 1999.

(51) Int. Cl.$^7$ ................................................ G02B 6/26
(52) U.S. Cl. .......................... 385/27; 385/50; 385/31; 359/341
(58) Field of Search ............................ 385/30, 27, 31, 385/49, 50, 88, 89; 359/341.1; 372/6

(56) References Cited

U.S. PATENT DOCUMENTS

| | | | |
|---|---|---|---|
| 4,464,762 A | 8/1984 | Furuya | 372/50 |
| 4,658,403 A | 4/1987 | Takiguchi et al. | 372/96 |
| 4,794,615 A | 12/1988 | Berger et al. | 372/69 |
| 4,815,079 A * | 3/1989 | Snitzer et al. | 372/6 |
| 4,856,017 A | 8/1989 | Ungar | 372/96 |
| 4,914,667 A | 4/1990 | Blonder et al. | 372/44 |
| 5,022,038 A | 6/1991 | Bradley | 372/50 |
| 5,022,042 A | 6/1991 | Bradley | 372/75 |
| 5,033,812 A | 7/1991 | Yoshida et al. | 350/96.19 |
| 5,123,070 A | 6/1992 | Bradley | 385/37 |
| 5,140,607 A | 8/1992 | Paiva | 372/70 |
| 5,243,676 A | 9/1993 | Bierlein et al. | 385/122 |
| 5,455,838 A | 10/1995 | Heritier et al. | 372/75 |
| 5,590,147 A | 12/1996 | Hobbs et al. | 372/75 |
| 5,594,747 A | 1/1997 | Ball | 372/31 |
| 5,619,369 A | 4/1997 | Yamamoto et al. | 359/332 |
| 5,621,749 A | 4/1997 | Baney | 372/69 |
| 5,623,508 A | 4/1997 | Grubb et al. | 372/3 |
| 5,647,038 A | 7/1997 | Minden et al. | 385/37 |
| 5,663,979 A | 9/1997 | Marshall | 372/103 |
| 5,666,372 A | 9/1997 | Ball et al. | 372/6 |
| 5,694,248 A | 12/1997 | Erdogan et al. | 359/570 |
| 5,712,715 A | 1/1998 | Erdogan et al. | 359/8 |
| 5,818,630 A | 10/1998 | Fermann et al. | 359/341 |
| 5,838,700 A | 11/1998 | Dianov et al. | 372/6 |
| 5,848,204 A | 12/1998 | Wanser | 385/12 |
| 5,999,673 A * | 12/1999 | Valentin et al. | 385/43 |

OTHER PUBLICATIONS

Ssu–Pin Ma and Shiao–Min Tseng, High–Performance Side–Polished Fibers and Applications as Liquid Crystal Clad Fiber Polarizers, 1997, Journal of Lighwave Technology, vol. 15, No., pp. 1554–1558.

M. Hofer, M.E. Fermann, and L. Golberg, High–Power Side Pumped Passively Mode–Locked Er–YB Fiber Laser 1998, IEEE Photonics Technology Letters, vol. 10, No. 9, pp. 1247–1249.

Th. Weber,, et al. Side–Pumped Fiber Laser, Applied Physics B. 63, 131–134 (1996).

* cited by examiner

Primary Examiner—Rodney Bovernick
Assistant Examiner—Sung Pak
(74) Attorney, Agent, or Firm—Barlow, Josephs & Holmes, Ltd.

(57) ABSTRACT

A side-pumped fiber laser includes an optical fiber having a core and a cladding. The core has an index of refraction n1 and the cladding has an index of refraction n2, wherein n1 is greater than n2. The fiber further includes a coupling window integrally formed within a channel formed in an upper side of fiber cladding. The coupling window consists of an optical material having an index of refraction n3 wherein n3 is greater than n1. The fiber laser further includes a laser light source that is directed through the coupling window wherein laser light is directly coupled into the core of the fiber. The fiber of the fiber laser also preferably includes Bragg gratings written into the core beneath the coupling window and a reflective material disposed in a second window formed beneath the Bragg gratings.

24 Claims, 1 Drawing Sheet

FIG. 2

SIDE-PUMPED FIBER LASER

Figure 1:
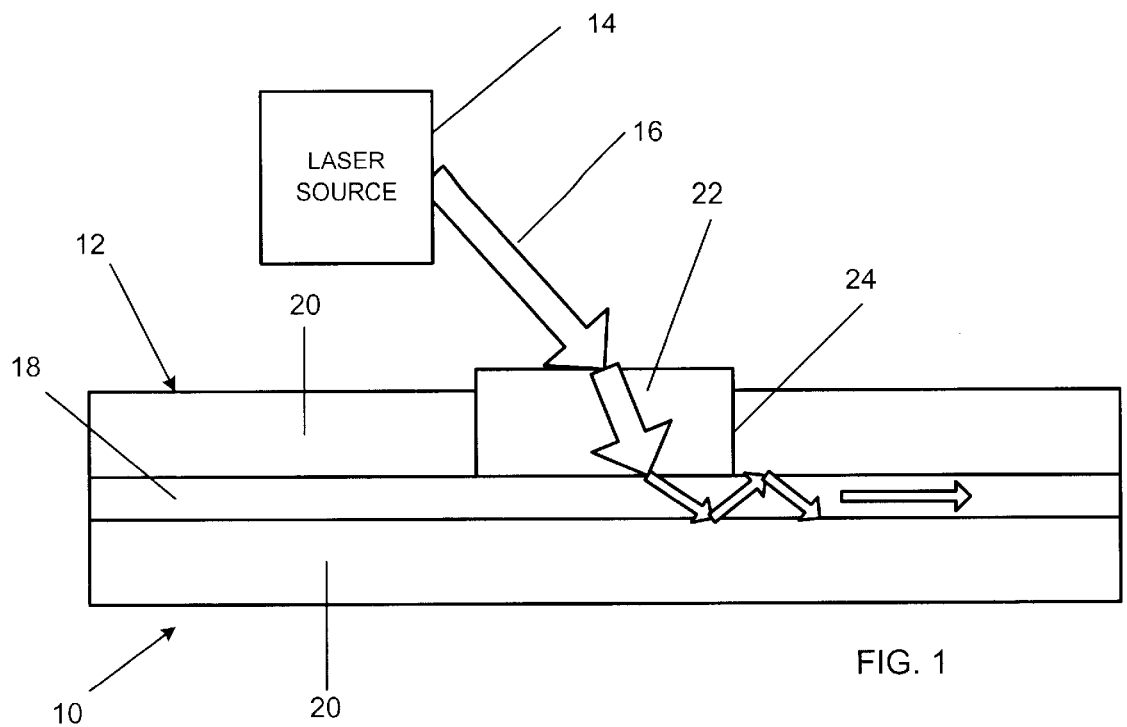

This application claims the benefit of U.S. Provisional application Ser. No. 60/123,211 filed Mar. 8, 1999 and 60/123,214 filed Mar. 8, 1999.

BACKGROUND AND SUMMARY OF THE INVENTION

The instant invention relates to fiber lasers, and more particularly to a side-pumped fiber laser.

Rare-earth doped fiber lasers are typically considered to be low power devices because efficient longitudinal coupling of pump laser light into the small fiber core is difficult, and there are limitations to the actual fiber itself. Limitations for higher output powers are given by the available power of the applied laser diode arrays that can be focused onto the fiber when longitudinally pumping, and the damage threshold of the core with respect to absorbed pump light intensity. It is thus difficult to increase the output power by only longitudinal pumping. It has been suggested by some that the solution for this problem is the repetitive pump-light in-coupling from the side of the fiber, hence the term "side-pumped". For example, side pumping arrangements of lasers are disclosed in U.S. Pat. Nos. 5,455,838 and 4,794,615. Side pumping of fiber lasers has been described in the articles by M. Hofer et al, "High-Power Side-Pumped Passively Mode-Locked Er-YB Fiber Laser" *IEEE Photonics Technology Letters*, Vol. 10, No. 9, September 1998, and Weber, et al , "Side-Pumped Fiber Laser", *Applied Physics B, Lasers and Optics*, Vol. 63, Pages 131–134 (1996). In the Hofer article, side pumping of a double clad fiber is accomplished by cutting a 90 degree V-shaped groove into the outer cladding of the fiber. A lens was used to focus diode emission onto the V-groove facet. In the Weber article, side pumping of a double clad fiber was accomplished by removing the silicone outer cladding on the upper side of the fiber over a length of about 1 mm. A prism with the same refractive index as the inner cladding is placed onto the stripped location. An index matching oil is applied between the prism and the fiber.

While the prior art attempts to side pump light into the fiber have shown that side coupling is possible, there is still a need in the industry to improve coupling efficiency and to improve configurations for manufacturing such side pumping arrangements.

In this regard, the instant invention provides a simple and efficient means for side-pumping light into the core of a single clad fiber. More specifically, the side-pumped fiber laser includes an optical fiber having a core and a cladding. The core has an index of refraction n1 and the cladding has an index of refraction n2, wherein n1 is greater than n2. The fiber further includes a coupling window disposed in a window channel formed in an upper side of fiber cladding. The fiber laser further includes a laser light source, such as a laser diode bar emitting a laser light beam, or multiple laser light beams that are directed through the coupling window wherein laser light is directly coupled into the core of the fiber.

The coupling window consists of an optical material having an index of refraction n3, wherein n3 is greater than n1. The window channel is formed by physically removing a portion of the cladding material. The optical material utilized to form the coupling material is deposited onto the fiber within the channel and becomes part of the integral structure of the fiber. The coupling window effectively forms an integrated prism to guide light into the fiber and enhance coupling of the light into the core. The optical material that forms the coupling window can be a graded index material or a step index material. The coupling window can be shaped as a rectangle, triangle or other geometric shape depending on the laser diode smile, i.e. emission pattern, and aperture to further enhance coupling efficiency. Since the window material is deposited directly onto the fiber, rather than glued onto the surface, there is no air gap and no need to use index matching gels, and thus the coupling efficient is increased and the whole structure is better integrated.

A second embodiment of the fiber laser includes a fiber wherein Bragg gratings are written into the core beneath the coupling window. The fiber further includes a reflective window (mirror) disposed in a second window channel formed in the opposing lower side of the cladding beneath the Bragg gratings. The reflective window consists of a reflective optical material deposited into the window channel. The reflective window can be used as a filter to filter out unwanted wavelengths. The reflective window can also be used to tune the wavelength of the fiber laser by using a feedback mechanism.

Accordingly, among the objects of the instant invention are: the provision of a side-pumped fiber laser having a high coupling efficiency; the provision of a side-pumped fiber laser that allows pumping of light directly into the core of the fiber through a window prism directly integrated into the structure of the fiber; the provision of a side-pumped fiber laser that can filter out unwanted wavelengths; the provision of a side-pumped fiber laser that is tunable; the provision of a side-pumped fiber laser including Bragg gratings to enhance and direct coupling of the light into the core; and the provision of a side-pumped fiber laser including repetitive side-coupling of light into the fiber.

Other objects, features and advantages of the invention shall become apparent as the description thereof proceeds when considered in connection with the accompanying illustrative drawings.

BRIEF DESCRIPTION OF THE DRAWING FIGURES

Figure 2:
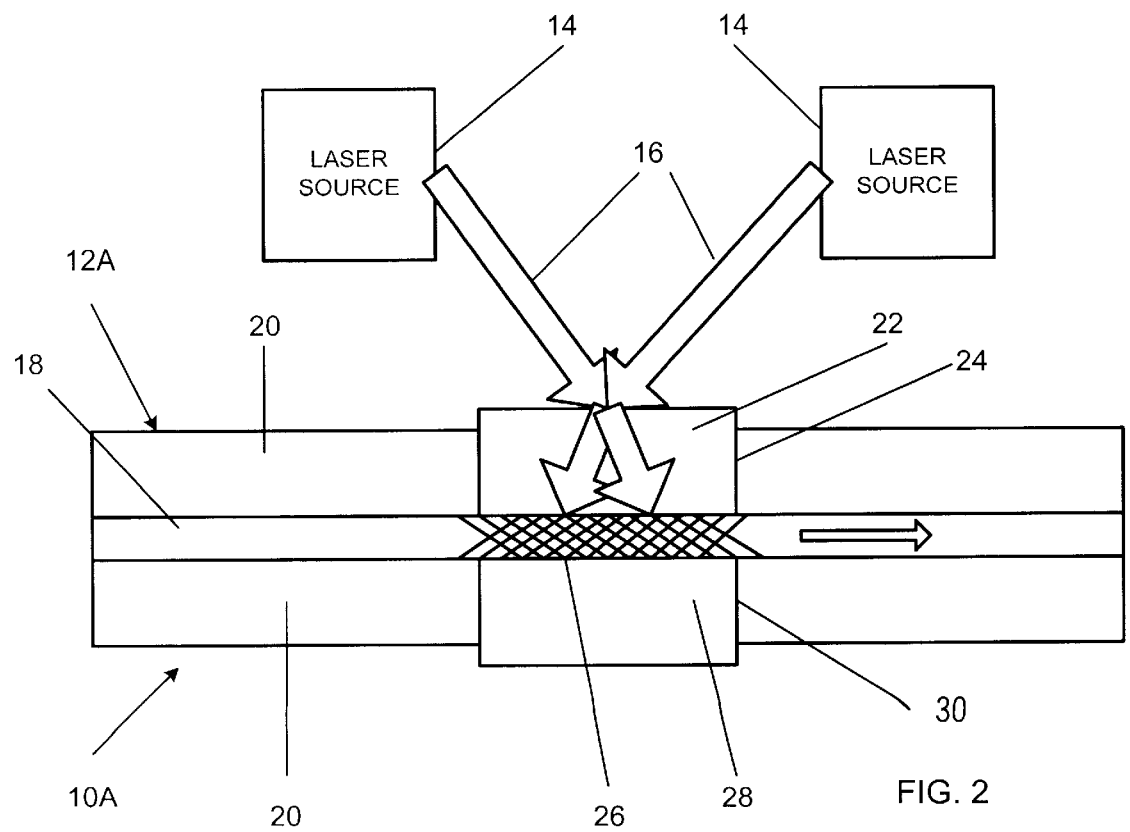

In the drawings which illustrate the best mode presently contemplated for carrying out the present invention:

FIG. 1 is a schematic cross-sectional view of a side-pumped fiber laser in accordance with the teachings of the present invention; and FIG. 2 is a schematic cross-sectional view of an alternative embodiment of a side-pumped fiber laser.

DESCRIPTION OF THE PREFERRED EMBODIMENT

Referring now to the drawings, the side-pumped fiber laser of the instant invention is illustrated and generally indicated at 10 in FIG. 1.

The side-pumped fiber laser comprises an optical fiber generally indicated at 12, and a laser light source generally indicated at 14.

The laser light source can comprise any source that is capable of emitting a laser light beam 16 that can be directed. The laser light source 14 can include, but is not limited to, laser diodes, and laser diode bars that include an array of laser diodes. Optical elements (not shown) for focusing the laser light beam 16 into a confined area may also be utilized.

The optical fiber 12 preferably comprises a multi-mode, single clad fiber of the type well known in the art. Other types of fibers are also contemplated, and the present disclosure is not intended to limit the scope of application with respect to the type of fiber. The fiber 12 includes a core 18 and a cladding 20.

The core 18 may or may not de doped with a rare-earth dopant. However, in accordance with the teachings of the present invention, the core 18 preferably contains a rare-earth doping material. The core 18 has an index of refraction n1 and the cladding 20 has an index of refraction n2, wherein n1 is greater than n2. This configuration of refractive indexes is conventional in the art. In order to couple light from the laser light source 14 into the side of the fiber 12, the fiber 12 further includes a coupling window 22 comprising an optical material having an index of refraction n3 which is greater than n1. The coupling window 22 is disposed in a window channel 24 formed in an upper side of fiber cladding 20. The window channel 24 is formed by removing cladding material from the fiber 12 to a depth which exposes or nearly exposes the core 18 of the fiber, and along a length of the fiber which ranges from about 1 mm to about 5 mm. A shorter length of removal is preferred rather than a longer length. Removal of portions of the cladding material can be accomplished by any of a variety of known methods, including side polishing of the fiber. Once the cladding material is removed, the resulting window channel 24 is filled with an optical material having an index of refraction n3 that is greater than the refractive index of the core. In other words, the optical window material is directly deposited onto the fiber and thus forms an integral part of the fiber. The belief is that the coupling window 22 will provide an integrated prism for introducing the laser light beam 16 directly to the fiber core 18. The optical material that forms the coupling window 22 can comprise a graded index material or a step index material. The coupling window 22 can be shaped as a rectangle, triangle or other geometric shape depending on the laser diode smile, i.e. emission pattern, and aperture to further enhance coupling efficiency. Since the window material is deposited directly onto the fiber, rather than glued onto the surface, there is no air gap and no need to use index matching gels as found when using external prisms, and thus the coupling efficiency is increased and the whole structure is better integrated.

Once the light beam 16 penetrates through the coupling window 22, it will be trapped within the interior of the fiber 12 and will eventually couple into the core 18 along the longitudinal extent of the fiber 12.

Referring now to FIG. 2, a second embodiment of the fiber laser 10A includes a fiber 12A having a core 18, a cladding 20, and coupling window 22 as described above. The fiber 12A further includes a series of Bragg gratings 26 written into the core 18 beneath the coupling window 22. The Bragg gratings 26 are written in multiple layers (approximately 100 layers) to achieve substantially 100% reflectivity. The gratings 26 are written into the fiber 12A at an angle of between about 20 degrees and about 30 degrees. The fiber 12A further includes a reflective window 28 disposed in a second window channel 30 formed in the opposing lower side of the cladding 20 beneath the Bragg gratings 26. The channel 30 is formed in the same manner as the upper channel 24. The reflective window 28 comprises a reflective optical material and essentially forms a reflective mirror beneath the Bragg gratings 26. The gratings 26 and reflective window (mirror) 28 are believed to facilitate coupling of the light and direction of the coupled light along the length of the fiber 12A.

The reflective window 28 can also be used as a filter to filter out unwanted wavelengths, and can further be used to tune the wavelength of the fiber laser by using a feedback mechanism (not shown).

The fiber laser 10A shown in FIG. 2 illustrates the use of multiple laser sources 14 (laser diode bars) to inject laser light beams into the side of the fiber 12A. The two laser diode bars 14 may be positioned at the same relative angle $\theta$ to the fiber or may be directed at different angles $\theta 1$ and $\theta 2$. Optical elements (not shown) may be employed to focus the light beams into smaller target area.

It is further contemplated that the present concepts can be utilized with regard to double clad and multi-clad fibers (diagrams not shown). In these cases, the window channels 24 and 30 may not need to extend to a depth immediately adjacent to the core, but rather since pump light is coupled into the inner cladding, the bottom of the window channels would terminate at a depth within the inner cladding, the depth thereof ranging from immediately adjacent to the core to several hundred microns away from the core.

It is also contemplated that the side-coupling window structures of the present invention will be repeated along the length of a fiber so that multiple light sources can be coupled into the side of the same fiber. Repetitive side-coupling will allow the use of lower power lasers at each coupling site, and reduce the incidence of physical damage to the fiber and core resulting from high power pumping of the fiber at a single pump location.

It can therefore be seen that the instant invention provides a simple and efficient interface for coupling laser light into the side surface of a fiber. Formation of the refractive coupling window, and the reflective window facilitate coupling of laser light into the core while the Bragg gratings facilitate direction of the laser light along the longitudinal length of the fiber. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A single clad optical fiber comprising:

a core;

a cladding immediately surrounding said core, said core having an index of refraction n1, said cladding having an index of refraction n2, wherein n1 is greater than n2; and a coupling window integrally formed within a first side of said cladding, and configured to provide a direct coupling path for pumping light injected into said coupling window to enter said core, said coupling window extending substantially entirely through said cladding in abutting relation to said core such that pump light injected into said coupling window passes directly through said coupling window into said core, said coupling window comprising an optical material having an index of refraction n3 wherein n3 is greater than n1.

2. The optical fiber of claim 1 wherein said fiber further comprises a reflective window integrally formed within a second side of said cladding opposite said first side, said reflective window comprising a reflective optical material, said reflective window extending substantially entirely through said cladding in abutting relation to said core.

3. The optical fiber of claim 1 wherein said optical material of said coupling window is deposited into a window channel formed in said cladding, said window channel having a depth substantially equal to a thickness of said cladding.

4. The optical fiber of claim 3 wherein said fiber further comprises a reflective window integrally formed within a second side of said cladding opposite said first side, said reflective window comprising a reflective optical material, said reflective window extending substantially entirely through said cladding in abutting relation to said core.

5. The optical fiber of claim 1 wherein said core includes Bragg gratings written into said core beneath said window channel.

6. The optical fiber of claim 5 wherein said Bragg gratings have substantially 100% reflectivity.

7. The optical fiber of claim 6 wherein said Bragg gratings are disposed at an angle of between about 20 degrees and about 30 degrees.

8. The optical fiber of claim 7 wherein said fiber further comprises a reflective window integrally formed within a second side of said cladding opposite said first side, said reflective window comprising a reflective optical material, said reflective window extending substantially entirely through said cladding in abutting relation to said core.

9. The optical fiber of claim 6 wherein said fiber further comprises a reflective window integrally formed within a second side of said cladding opposite said first side, said reflective window comprising a reflective optical material, said reflective window extending substantially entirely through said cladding in abutting relation to said core.

10. The optical fiber of claim 5 wherein said Bragg gratings are disposed at an angle of between about 20 degrees and about 30 degrees.

11. The optical fiber of claim 10 wherein said fiber further comprises a reflective window integrally formed within a second side of said cladding opposite said first side, said reflective window comprising a reflective optical material, said reflective window extending substantially entirely through said cladding in abutting relation to said core.

12. The optical fiber of claim 5 wherein said fiber further comprises a reflective window integrally formed within a second side of said cladding opposite said first side, said reflective window comprising a reflective optical material, said reflective window extending substantially entirely through said cladding in abutting relation to said core.

13. A fiber laser comprising:
  a single-clad optical fiber having a core and a cladding immediately surround said core, said core having an index of refraction n1, said cladding having an index of refraction n2, wherein n1 is greater than n2, said fiber further having a coupling window integrally formed within a first side of said cladding, and configured to provide a direct coupling path for pumping light injected into said coupling window to enter said core, said coupling window extending substantially entirely through said cladding in abutting relation to said core,
  said coupling window comprising an optical material having an index of refraction n3 wherein n3 is greater than n1; and
  a light source emitting a light beam, said light beam being injected into said coupling window, wherein said light beam passes directly through said coupling window and is directly coupled into said core.

14. The fiber laser of claim 13 wherein said optical material of said coupling window is deposited into a window channel formed in said cladding, said window channel having a depth substantially equal to a thickness of said cladding.

15. The fiber laser of claim 14 wherein said fiber further comprises a reflective window integrally formed within a second side of said cladding opposite said first side, said reflective window comprising a reflective optical material, said reflective window extending substantially entirely through said cladding in abutting relation to said core.

16. The fiber laser of claim 13 wherein said fiber further comprises a reflective window integrally formed within a second side of said cladding opposite said first side, said reflective window comprising a reflective optical material, said reflective window extending substantially entirely through said cladding in abutting relation to said core.

17. The fiber laser of claim 16 wherein said fiber further comprises a reflective window integrally formed within a second side of said cladding opposite said first side, said reflective window comprising a reflective optical material, said reflective window extending substantially entirely through said cladding in abutting relation to said core.

18. The fiber laser of claim 13 wherein said core includes Bragg gratings written into said core beneath said window channel.

19. The fiber laser of claim 18 wherein said Bragg gratings have substantially 100% reflectivity.

20. The fiber laser of claim 19 wherein said Bragg gratings are disposed at an angle of between about 20 degrees and about 30 degrees.

21. The fiber laser of claim 20 wherein said fiber further comprises a reflective window integrally formed within a second side of said cladding opposite said first side, said reflective window comprising a reflective optical material, said reflective window extending substantially entirely through said cladding in abutting relation to said core.

22. The fiber laser of claim 19 wherein said fiber further comprises a reflective window integrally formed within a second side of said cladding opposite said first side, said reflective window comprising a reflective optical material, said reflective window extending substantially entirely through said cladding in abutting relation to said core.

23. The fiber laser of claim 18 wherein said Bragg gratings are disposed at an angle of between about 20 degrees and about 30 degrees.

24. The fiber laser of claim 23 wherein said fiber further comprises a reflective window integrally formed within a second side of said cladding opposite said first side, said reflective window comprising a reflective optical material, said reflective window extending substantially entirely through said cladding in abutting relation to said core.

* * * * *